: (12) United States Patent
Drocco

(10) Patent No.: US 11,590,525 B2
(45) Date of Patent: Feb. 28, 2023

(54) DEVICE FOR CLOSING A DELIVERY HEAD OF A DISPENSING MACHINE FOR DELIVERING FLUID PRODUCTS, SUCH AS DYES FOR PAINTS AND THE LIKE

(71) Applicant: DROMONT S.p.A., Grinzane Cavour (IT)

(72) Inventor: Luca Drocco, Alba (IT)

(73) Assignee: DROMONT S.p.A.

( * ) Notice: Subject to any disclaimer, the term of this patent is extended or adjusted under 35 U.S.C. 154(b) by 328 days.

(21) Appl. No.: 16/876,349

(22) Filed: May 18, 2020

(65) Prior Publication Data

US 2020/0368771 A1 Nov. 26, 2020

(30) Foreign Application Priority Data

May 24, 2019 (IT) .......................... 102019000007192

(51) Int. Cl.
| | |
|---|---|
| *B05B 1/30* | (2006.01) |
| *B05B 15/58* | (2018.01) |
| *B05B 15/50* | (2018.01) |
| *B01F 25/00* | (2022.01) |
| *B01F 35/71* | (2022.01) |

(Continued)

(52) U.S. Cl.
CPC .............. *B05B 15/58* (2018.02); *B01F 23/45* (2022.01); *B01F 25/14* (2022.01); *B01F 35/7179* (2022.01); *B05B 1/3013* (2013.01); *B05B 15/50* (2018.02); *B65B 39/00* (2013.01); *F16H 25/2025* (2013.01); *B01F 2101/30* (2022.01);

(Continued)

(58) Field of Classification Search
CPC ....... B05B 15/58; B05B 1/3013; B05B 15/50; F16H 2025/204; F16H 25/2025; B01F 23/45; B01F 25/14; B01F 35/7179; B01F 2101/30; B65B 39/00; B65B 2220/14; F16K 23/00
See application file for complete search history.

(56) References Cited

U.S. PATENT DOCUMENTS 4,469,043 A * 9/1984 Kohler .................... B05B 15/52
118/63
4,821,920 A * 4/1989 Lin ..................... B65G 47/1457
198/397.05

(Continued)

FOREIGN PATENT DOCUMENTS

| WO | 2005090165 A1 | 9/2005 |
| WO | 2014013315 A1 | 1/2014 |

(Continued)

OTHER PUBLICATIONS

European Search Report dated Jan. 30, 2020. 8 pages.

*Primary Examiner* — Frederick C Nicolas
(74) *Attorney, Agent, or Firm* — RMCK Law Group PLC

(57) ABSTRACT

A device for closing a delivery head of a dispensing machine for delivering fluid products includes a stationary support, a drive shaft, which rotates with respect to the stationary support around a vertical axis, and can be moved with respect to the stationary support along the same vertical axis, a cup-shaped closing element carried at the distal end of an arm fixed to a lower end of the drive shaft, and a screw and nut mechanism which controls a translation of the closing element in the direction of the longitudinal axis and a rotation movement to the longitudinal axis using a single actuator.

4 Claims, 7 Drawing Sheets

(51) Int. Cl.
 B65B 39/00 (2006.01)
 F16H 25/20 (2006.01)
 B01F 23/45 (2022.01)
 B01F 101/30 (2022.01)

(52) U.S. Cl.
 CPC .... *B65B 2220/14* (2013.01); *F16H 2025/204* (2013.01)

(56) References Cited

U.S. PATENT DOCUMENTS

| | | | | |
|---|---|---|---|---|
| 5,562,129 | A * | 10/1996 | Graffin | B67C 3/004 |
| | | | | 141/147 |
| 2015/0041502 | A1* | 2/2015 | Ineichen | B65D 83/28 |
| | | | | 222/148 |
| 2015/0158045 | A1* | 6/2015 | Bettini | B05B 15/50 |
| | | | | 239/104 |
| 2017/0189924 | A1* | 7/2017 | Drocco | B05B 15/52 |
| 2018/0126346 | A1* | 5/2018 | Post | B01F 13/1058 |
| 2020/0398510 | A1* | 12/2020 | Peter | B29D 11/00009 |

FOREIGN PATENT DOCUMENTS

| | | |
|---|---|---|
| WO | 2015170227 A1 | 11/2015 |
| WO | 2017208181 A1 | 12/2017 |

\* cited by examiner

DEVICE FOR CLOSING A DELIVERY HEAD OF A DISPENSING MACHINE FOR DELIVERING FLUID PRODUCTS, SUCH AS DYES FOR PAINTS AND THE LIKE

CROSS-REFERENCE TO RELATED APPLICATIONS

This application claims priority to Italian Patent Application No. 102019000007192 filed May 24, 2019. The disclosure of the above application is incorporated herein by reference in its entirety.

FIELD OF THE INVENTION

The present invention relates, in general, to dispensing machines for delivering fluid products such as dyes for paints or the like.

More precisely, the invention relates to a device for closing a delivery head of a dispensing machine for delivering fluid products.

The invention was developed in particular for the application to dispensing machines for delivering dyes for preparing paints. In the following description, reference will be made to this specific field without, however, losing generality.

DESCRIPTION OF THE PRIOR ART

A dispensing machine for delivering dyes for preparing paints generally comprises a plurality of containers containing respective dyes which, in the case of so-called "simultaneous machines", they are connected to a single delivery head by means of respective ducts. A plurality of dispensing pumps feed dosed quantities of dyes from the containers to the delivery head.

The delivery head usually comprises a plurality of nozzles with their vertical axes parallel to each other, open at their lower ends, and enclosed in a tubular member having an open lower edge.

Delivery of the dyes from the nozzles of the delivery head is typically discontinuous. When delivery of the dye ends, elongated drops of dyes form, which protrude from the lower ends of the nozzles of the delivery head. For correct operation of the dispensing machine it is necessary that these drops of dyes remain in a fluid state and do not harden.

To avoid or limit the risk of hardening of the drops of dyes at the lower ends of the nozzles of the delivery head, the dispensing machines can be equipped with a closing device that closes the lower end of the delivery head at the end of a dye-dispensing step. In this way, the area around the lower ends of the nozzles of the delivery head is isolated from the external environment and drying of the drops of dye due to exposure to air is reduced. The quality of the isolation can be improved by means of a gasket in the contact between the closing element and the lower end of the tubular member of the delivery head. The closing element can be provided with a sponge soaked in liquid to maintain a humid environment in the terminal area of the delivery head when the closing element is applied to the delivery head, in order to further hinder the drying of the drops of dye.

Known devices for closing the delivery heads can be equipped with actuators for automatically closing the delivery heads at the end of the dispensing steps, and for automatically opening the delivery heads before a new dispensing step. In a known solution, the closing element moves in a transverse direction with respect to the vertical axis of the delivery head between an open position and a closed position.

Known closing devices are not completely satisfactory for various reasons. Firstly, the movement in the transverse direction of the closing element between the closed position and the open position can cause detachment of the drops of dyes protruding from the lower ends of the nozzles of the delivery head. Another drawback is that the seal between the closing element and the delivery head may be ineffective due to an inefficient transmission of force from the transverse direction of the closing movement to the direction coaxial with the delivery head. Furthermore, the clamping force that presses the gasket in the closing element against the lower edge of the delivery head may be uneven, and clearances may form between the gasket of the closing element and the delivery head, which reduce the effectiveness of the closing device. Known closing devices may also be affected by adjustment difficulties.

OBJECT AND SUMMARY OF THE INVENTION

The present invention aims to provide a device for closing a delivery head of a dispensing machine for delivering fluid products, which overcomes the problems of the prior art.

According to the present invention, this object is achieved by a closing device having the characteristics forming the subject of claim 1.

The claims form an integral part of the disclosure provided here in relation to the invention.

One of the characteristic aspects of the closing device according to the present invention is that the mechanism that controls the movement of the closing element between the open position and the closed position, and vice versa, is able to control a translation of the closing element in the direction of the longitudinal axis of the delivery head, and a rotation movement around an axis parallel to the axis of the delivery head, using a single actuator. The translation and rotation movements of the closing element are controlled in series with each other following a single stroke of the actuator. This solution allows closing to be obtained, with a bottom-up movement of the closing element, which gently engages the head and uniformly compresses the seal of the closing element. The combined movement of translation and rotation of the closing element avoids the risk of detachment of the dye drops, and allows a greater closing force, which makes the isolation of the dispensing area from the external environment more effective.

BRIEF DESCRIPTION OF THE DRAWINGS

Further characteristics and advantages of the present invention will become apparent from the detailed description that follows, given purely by way of non-limiting example, with reference to the attached drawings, wherein.

DETAILED DESCRIPTION

Figure 1:
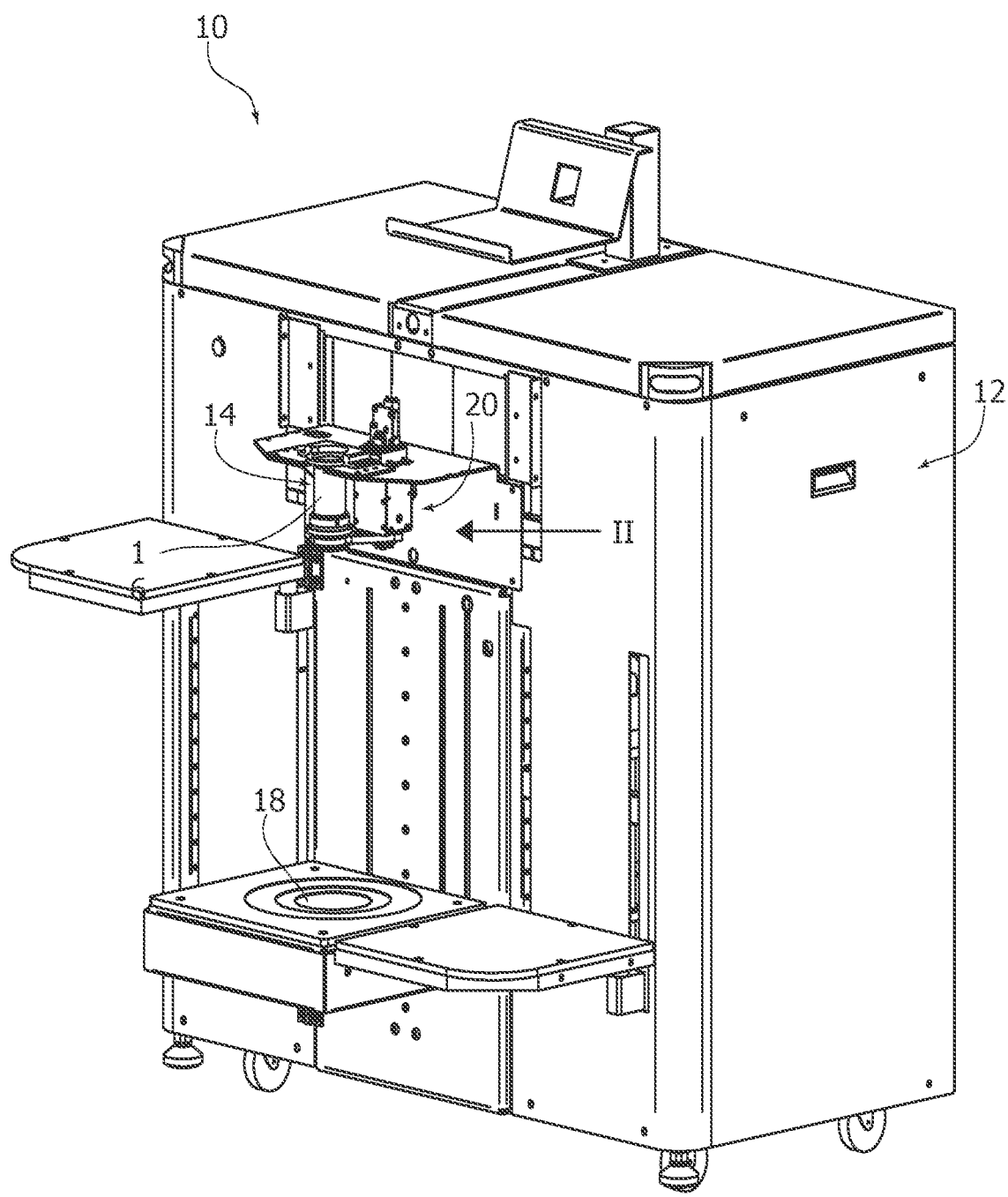
FIG. 1 is a perspective view of a dispensing machine provided with a closing device according to the present invention.

With reference to FIG. 1, numeral 10 indicates a dispensing machine configured for delivering dosed quantities of various fluid products, such as, for example, dyes for preparing paints. The machine 10 comprises a stock 12 in which a plurality of containers (canisters) containing different fluid products (typically dyes) are contained. The containers are connected to respective ducts by means of respective dispensing pumps.

The ducts coming from the various containers of the machine 10 are connected to a delivery head 14 inside which a plurality of nozzles—oriented in a vertical direction—are arranged and connected to respective ducts. The nozzles of the delivery head 14 are enclosed in a tubular member 16 having an open lower edge.

The machine 10 comprises a base 18 on which containers are placed in which the dyes dispensed by the delivery head 14 are poured.

The dispensing machine 10 comprises a closing device 20 for closing the delivery head 14 at the end of each step of dispensing dyes.

Figure 2:
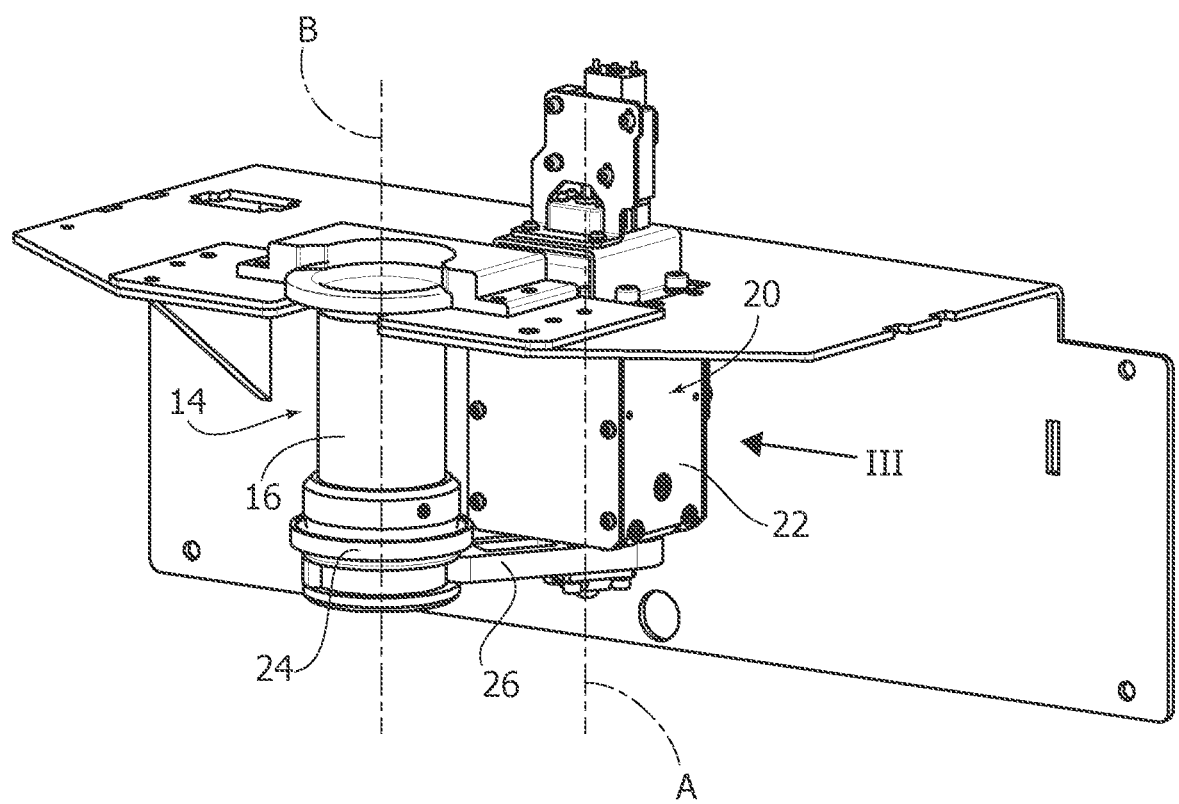
FIG. 2 is a perspective view on a larger scale of the part indicated by the arrow II in FIG. 1.

With reference to FIG. 2, the closing device 20 comprises a stationary support 22 fixed to a plate of the machine 10. The closing device 20 comprises a cup-shaped closing element 24 carried by an arm 26, and movable between a closed position and an open position. In the closed position, the closing element 24 is applied to the open lower edge of the tubular member 16 of the delivery head 14. In the open position, the closing element 24 is disengaged from the delivery head 14 and is moved laterally with respect to the open lower edge of the delivery head 14 so as not to hinder the dispensing of fluid products.

Figure 3:
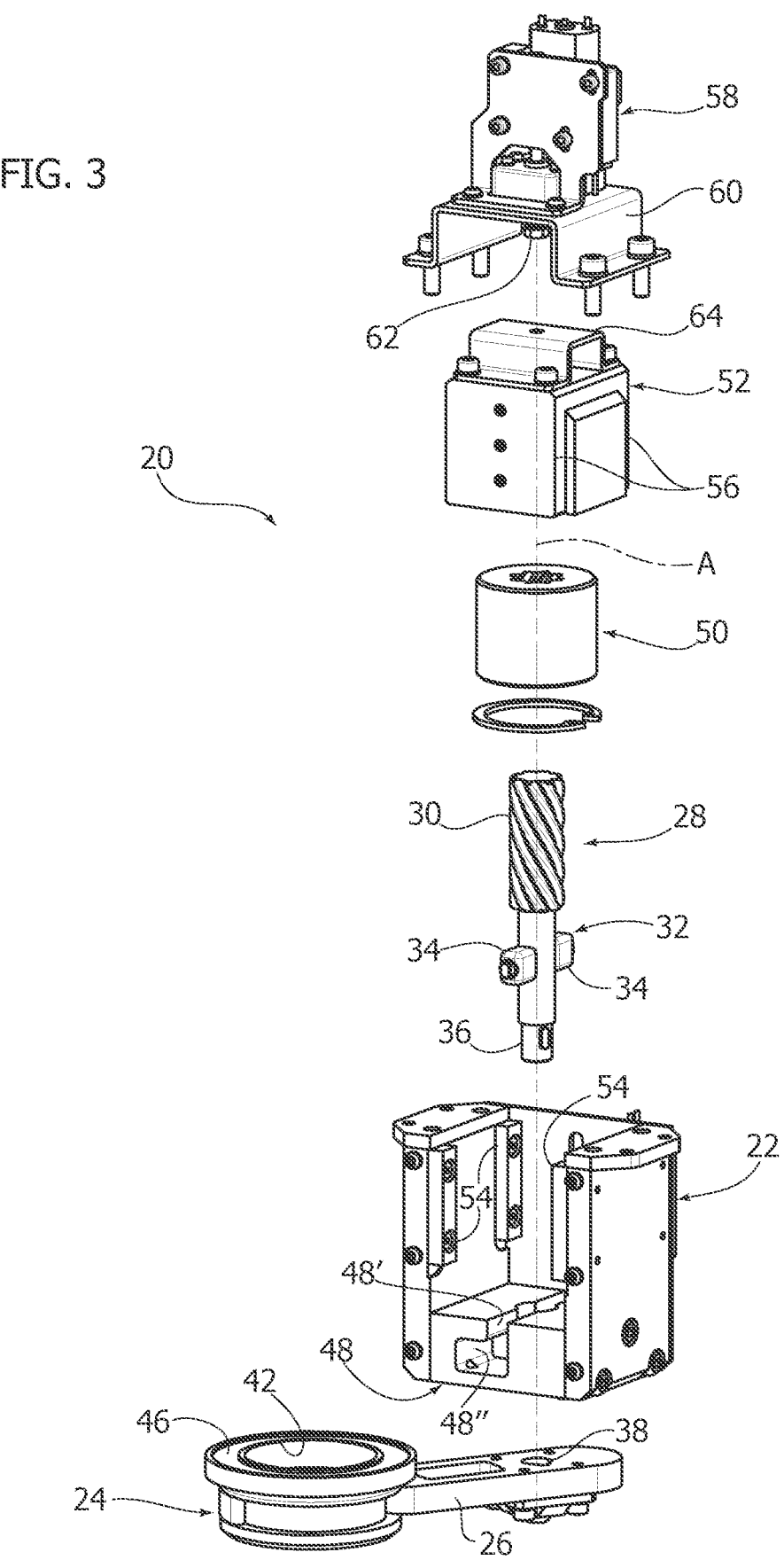
FIG. 3 is an exploded perspective view of the closing device indicated by the arrow III in FIG. 2.
Figure 4:
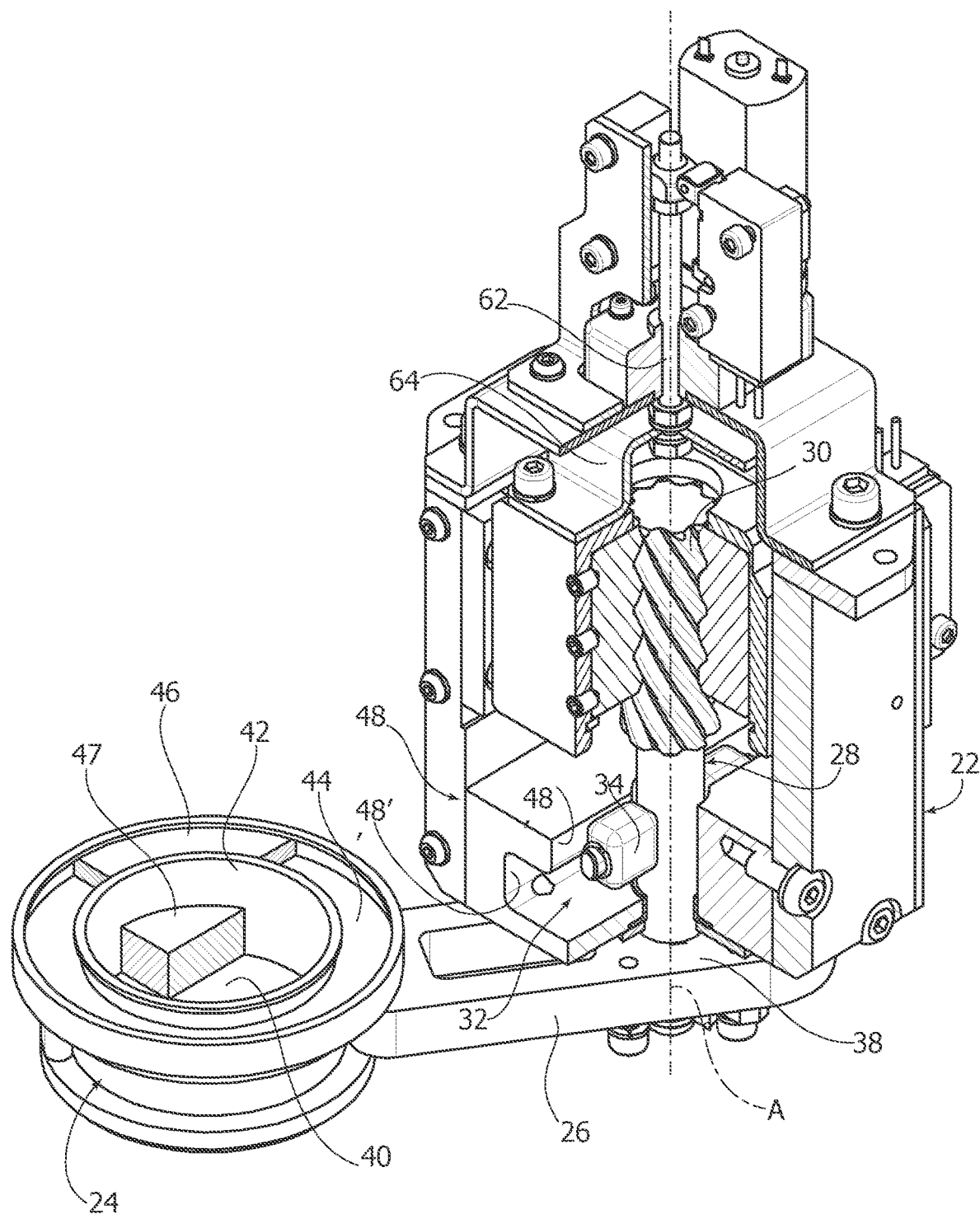
FIG. 4 is a partially cross-sectioned perspective view of the closing device according to the present invention.

With reference to FIGS. 3 and 4, the closing device 20 comprises a drive shaft 28 having a longitudinal axis A that is vertical and parallel to the longitudinal vertical axis B (FIG. 2) of the delivery head 14. The drive shaft 28 carries a screw 30 that is coaxial to the axis A which can be formed integrally on the shaft 28 or can consist of a separate component fixed to the shaft 28.

The drive shaft 28 also comprises a cam-follower 32 formed by two protruding elements 34 of a parallelepiped shape, fixed with respect to the drive shaft 38 and protruding from the outer surface of the drive shaft 28 along a perpendicular direction with respect to the longitudinal axis A. The drive shaft 28 has a lower end 36 which protrudes below the stationary support 22.

The arm 26 carrying the closing element 24 is located below the stationary support 22 and has a base 38 fixed to the lower portion 36 of the drive shaft 28. The closing element 24 is fixed to the distal end of the arm 26, and is eccentric with respect to the longitudinal axis A.

As can be seen in greater detail in FIG. 4, the closing element 24 has a bottom wall 40 and an open upper edge 42. An annular channel 44 open upwards is formed along the open upper edge 42 in which a flat ring-shaped gasket 46 is housed. A sponge 47 intended to be soaked in water can be placed on the bottom wall 40 of the closing element 24.

Still with reference to FIGS. 3 and 4, the closing device 20 comprises a cam 48 fixed to a lower part of the stationary support 22 and cooperating with the cam-follower 32 carried by the drive shaft 28. The cam 48 has a first cam portion 48' and a second portion of cam 48". The first cam portion 48' has the shape of a slot parallel to the axis A, and with a width in the direction perpendicular to the axis A that is slightly greater than the width of the protruding elements 34 of the cam-follower 32. The second cam portion 48" is formed by two chambers, each of which is configured to receive a respective protruding element 34 of the cam-follower 32, and having a height in a direction parallel to the longitudinal axis A that is slightly higher than the height in the direction of the longitudinal axis A of the protruding elements 34.

When the cam-follower 32 of the drive shaft 38 engages the first cam portion 48', the walls of the first chamber portion 48 prevent rotation of the drive shaft 28 about the axis A, and allow a translation of the drive shaft 28 in the direction of the longitudinal axis A. When the drive member 32 engages the second cam portion 48", the walls of the second cam portion 48" prevent translation of the drive shaft 28 in the direction of the longitudinal axis A and allow rotation of the drive shaft 28 about the longitudinal axis A.

The closing device 20 comprises a nut 50 that engages the screw 30 of the drive shaft 28. The screw and the nut have a helix angle with a very high thread, close to 60°, so that the screw/nut couple has a high reversibility. The appropriate choice of materials used for the screw/nut couple and the thread profile also allows the creation of a particularly low friction coefficient favoring the aforesaid reversibility.

The nut 50 is fixed to a support of the nut 52 that engages a vertical guide 54 of the stationary support 22. The vertical guide 54 engages surfaces 56 of the support of the nut 52, and prevents rotation of the support of the nut 52 (and of the nut 50 fixed thereto) around the longitudinal axis A. The support of the nut and the nut 50 fixed thereto are free to translate with respect to the stationary support 22 in the direction of the longitudinal axis A and are guided along this direction by the vertical guide 54 of the stationary support 22.

The closing device 20 further comprises an actuator 58 which controls the movement of the support of the nut 52 in the direction of the longitudinal axis A between a raised position and a lowered position, and vice versa. The actuator 58 can be a commercial linear actuator and can be fixed to the upper part of the stationary support 22 by means of a flange 60. With reference in particular to FIG. 4, the actuator 58 can have a vertically movable pin 62 coaxial to the axis A, and having a lower end fixed to a bracket 64 fixed to the upper part of the support of the nut 52.

The operation of the closing device 20 will now be described with reference to FIGS. 5-7.

Figure 5:
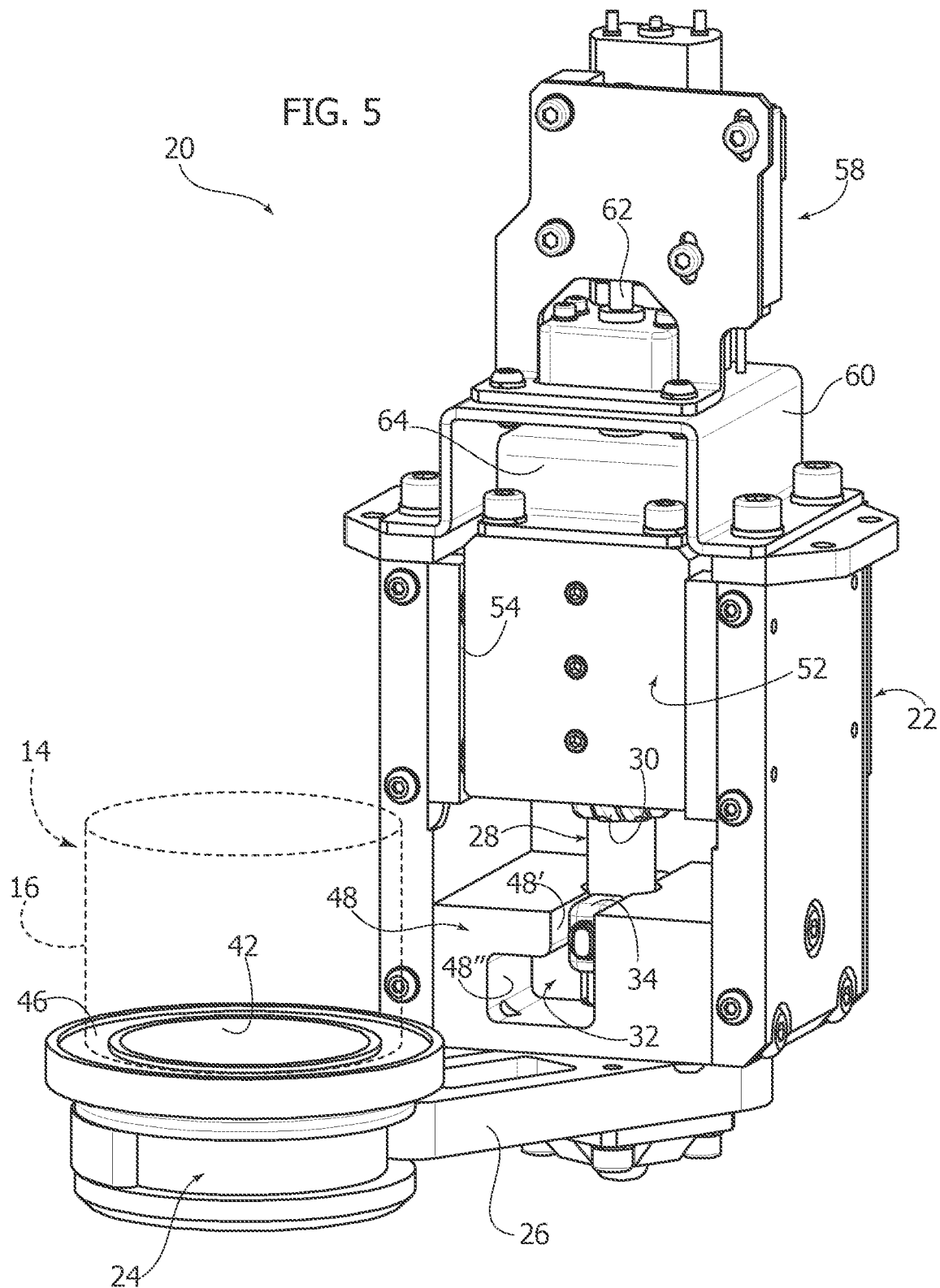
FIGS. 5, 6 and 7 are perspective views illustrating some steps of the operation of the closing device according to the present invention.

In FIG. 5 the closing device 20 is in the closed position. In this position, the closing element 24 is pressed against the lower end of the delivery head 14. The gasket 46 carried by the closing element 24 is pressed against the open lower edge of the tubular member 16 of the delivery head 14. In this condition, the lower ends of the nozzles of the delivery head 14 are isolated from the external environment and are contained in a humid environment due to the presence of the sponge 47 soaked in water located on the bottom 40 of the closing element 24.

In this configuration, the actuator 58 of the closing device 20 is in the raised position and the cam-follower 32 of the control shaft 28 engages the first cam portion 48' of the cam 48. In this condition, the first cam portion 48' prevents rotation of the control shaft 28 around the axis A, but does not prevent translation of the control shaft 28 in the direction of the longitudinal axis A.

Starting from the configuration illustrated in FIG. 5, the actuator 58 controls a downward movement of the support of the nut 52 and, consequently, of the nut 50 fixed thereto. During the first step of the downward stroke of the support of the nut 52, the cam-follower 32, engaged with the first portion 48' of the cam 48, prevents rotation of the drive shaft 28 about the axis A. Therefore, the drive shaft 28 moves in the direction A together with the nut 50. Then, the drive shaft 28 moves the arm 26 and the closing element 24 downwards. In this way, the closing element 24 disengages from the lower end of the tubular member 16 of the delivery head 14, as shown in FIG. 6.

Figure 6:
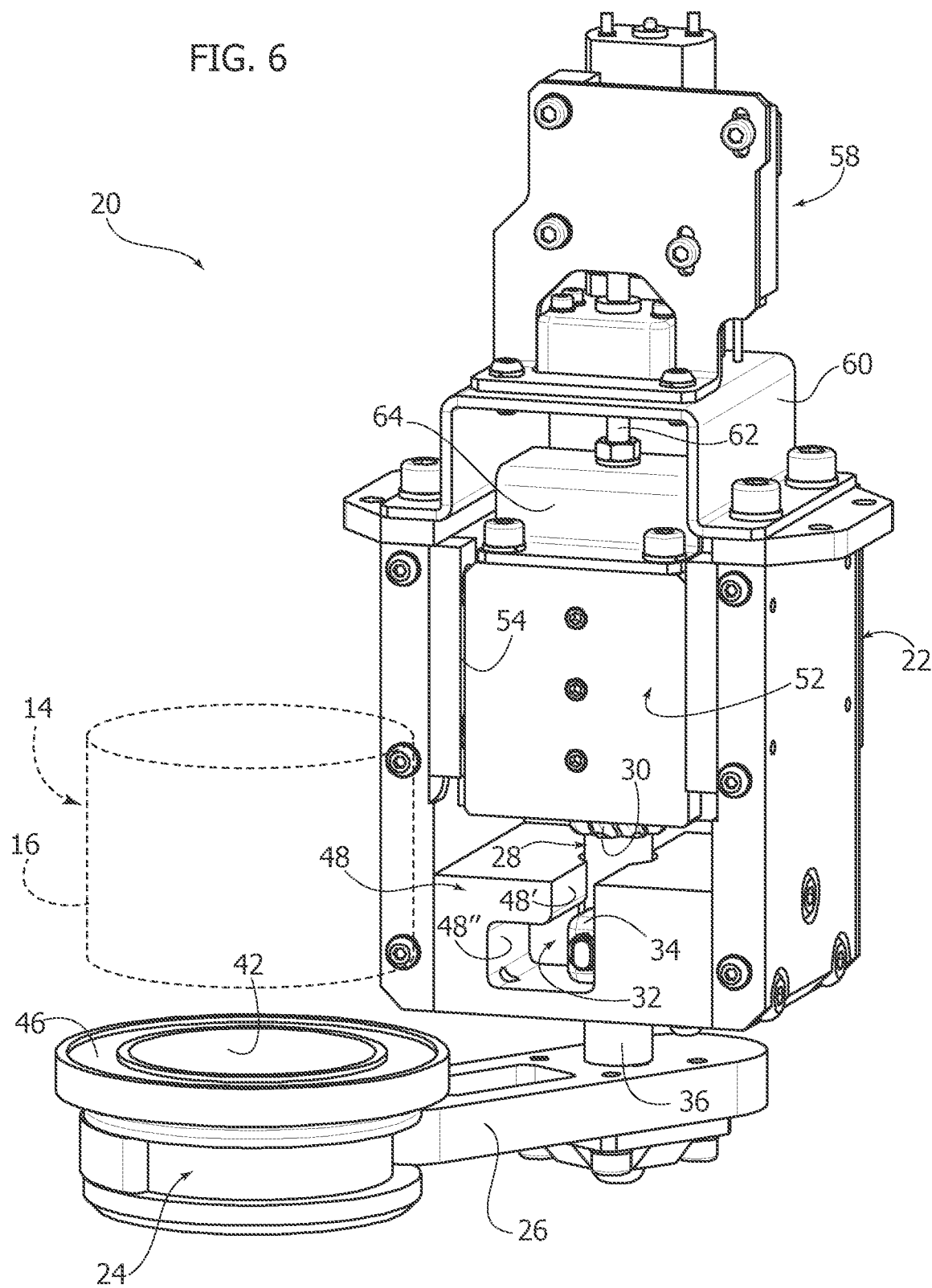
Figure 7:
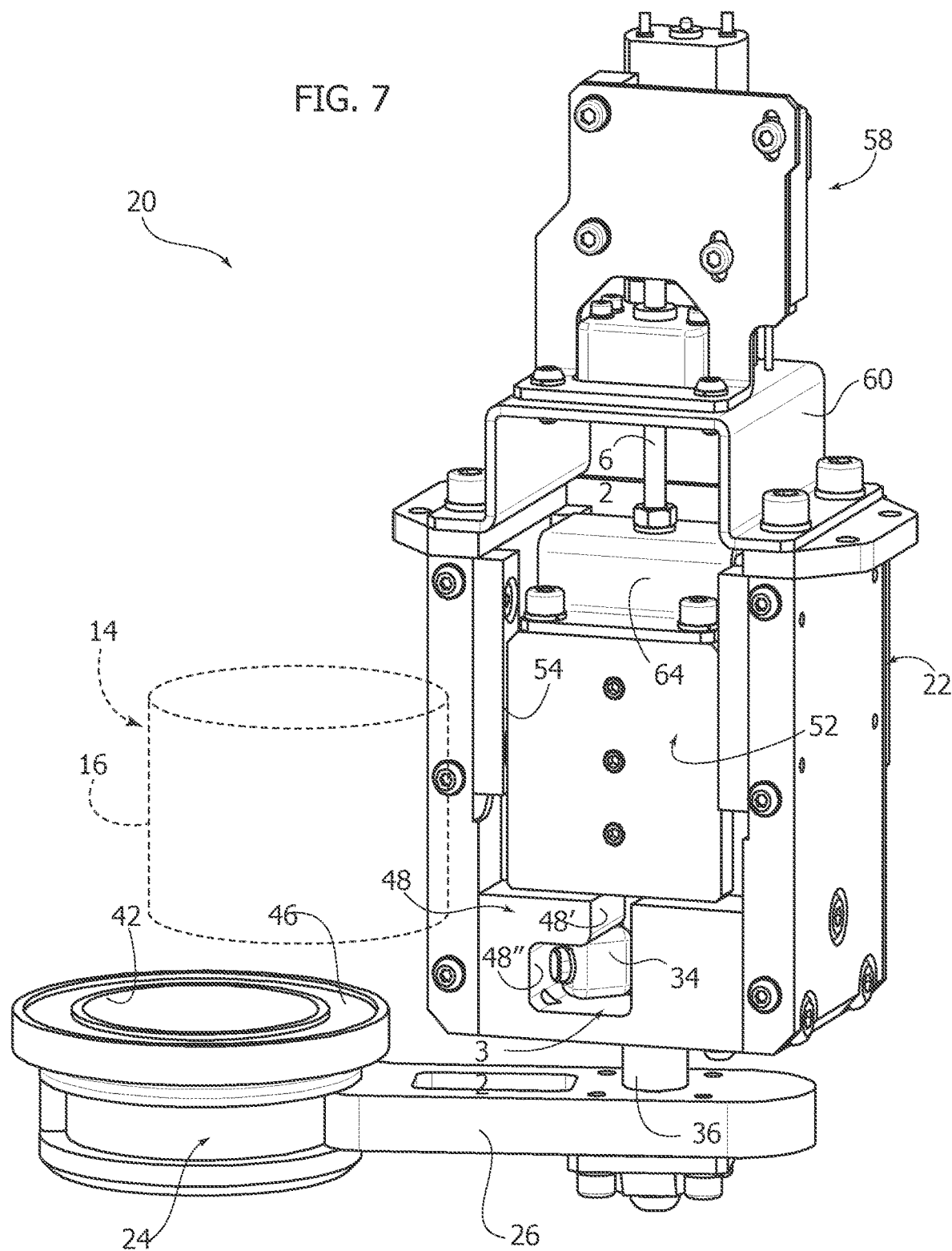

In the configuration illustrated in FIG. 6, the cam-follower 32 has disengaged from the first cam portion 48'. At this point, the actuator 58 continues to move the support of the nut 52 and the nut 50 downwards. However, the drive shaft 28 cannot move further downwards since the cam-follower 32 is in contact with the lower wall of the second cam portion 48". At this point, thanks to the remarkable reversibility and the low friction coefficient of the screw/nut couple used, continuing the downward movement of the nut 50, the drive shaft 28, being unable to translate axially, rotates around the axis A since the second cam portion 48" allows rotation of the cam-follower 32. Then, the drive shaft 28 rotates the arm 26 around the vertical axis A and moves the closing element 24 with respect to the lower end of the delivery head 14, freeing the space under the delivery head 14 to allow the dispensing of dyes. Rotation of the arm 26 about the axis ends when the actuator 58 reaches its completely lowered position.

The aforesaid operations are repeated in reverse order when the actuator 58 is moved from the lowered position to the raised position.

A particularly advantageous characteristic of the closing device according to the present invention is that the engagement of the closing element 24 on the delivery head 14 occurs along a vertical direction. Therefore, the gasket 46 is uniformly compressed. The actuator 58 is able to apply a high closing force, which ensures effective compression of the gasket 46 against the open lower edge of the delivery head 14. Furthermore, during the opening step, the movement of the closing element 24 downwards, preceding the horizontal displacement necessary to clear the dosing area, avoids the risk of intercepting and cutting the drops hanging at the lower ends of the nozzles of the delivery head 14, and avoids vibrations of the delivery head 14.

Of course, without prejudice to the principle of the invention, the details of construction and the embodiments can be widely varied with respect to those described and illustrated, without thereby departing from the scope of the invention as defined by the claims that follow.

The invention claimed is:

1. A device for closing a delivery head of a dispensing machine for delivering fluid products, comprising:
a stationary support,
a drive shaft having a lower end, the drive shaft being rotatable with respect to the stationary support around a vertical axis and movable with respect to the stationary support along said vertical axis,
an arm having a distal end, the arm being fixed to said lower end of the drive shaft,
a cup-shaped closing element carried at said distal end of said arm, wherein the closing element has an open upper edge capable of engaging a lower edge of a delivery head,
a screw and nut mechanism including a screw fixed to the drive shaft and a nut rotationally fixed with respect to the stationary support and movable with respect to the stationary support along said vertical axis, and
a cam carried by the stationary support and cooperating with a cam-follower carried by the drive shaft,
wherein said cam has a first cam portion and a second cam portion,
wherein when the cam-follower engages the first cam portion, the drive shaft is rotationally bound to the stationary support, and is free to move along the vertical axis,
wherein when the cam-follower engages the second cam portion, the drive shaft is axially bound to the stationary support, and is free to rotate around the vertical axis, in such a way that a vertical stroke of the nut along the vertical axis between a raised position and a lowered position controls, in succession, a translation of the drive shaft along the vertical axis and a rotation of the drive shaft around the vertical axis, and
wherein a translation of the nut from the lowered position to the raised position controls, in succession, a rotation of the drive shaft around the vertical axis and a translation of the drive shaft along the vertical axis.

2. The device according to claim 1, comprising a linear actuator having a pin coaxial to said vertical axis and fixed to a nut support to which said nut is fixed.

3. The device according to claim 2, wherein said nut support engages vertical guides carried by said stationary support.

4. The device according to claim 1, comprising a gasket resting on a surface of the open upper edge of the cup-shaped closing element.

* * * * *